No. 614,568. Patented Nov. 22, 1898.
L. MELANOWSKI.
CHAIN ADJUSTMENT FOR VELOCIPEDES.
(Application filed Apr. 2, 1898.)
(No Model.)
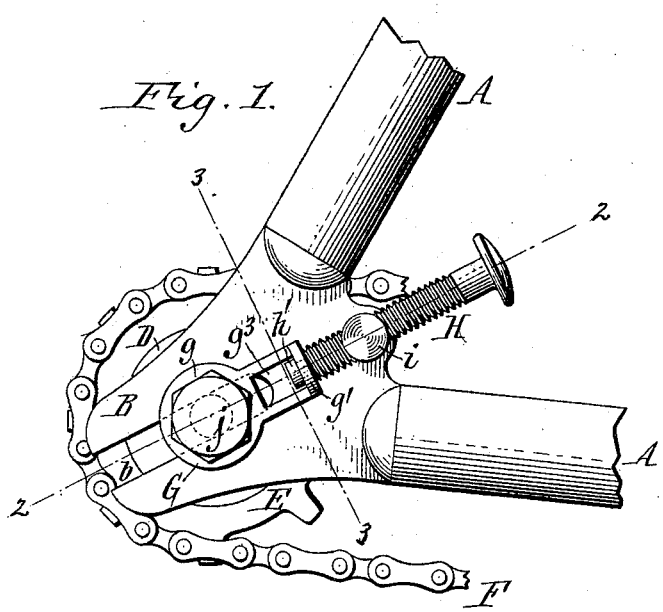
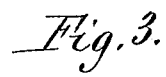
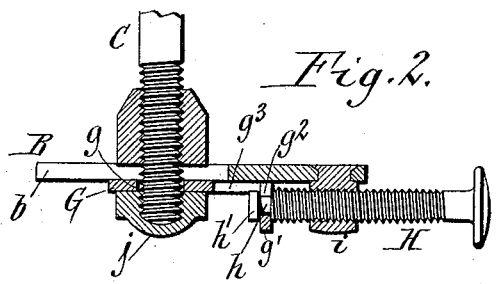
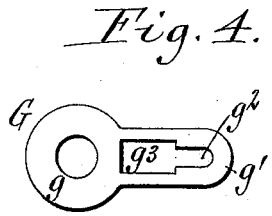
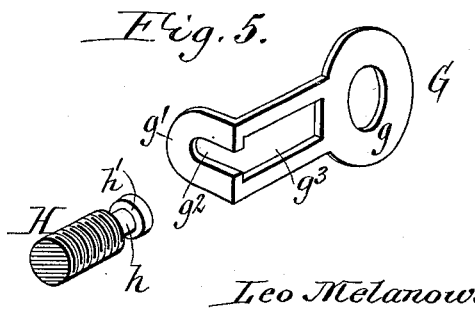
Witnesses:
Henry L. Deck.
Chas. F. Burkhart.
Leo Melanowski, Inventor,
By Wilhelm & Bonner
Attorneys

UNITED STATES PATENT OFFICE.

LEO MELANOWSKI, OF BUFFALO, NEW YORK, ASSIGNOR TO THE CROSBY & MAYER COMPANY, OF SAME PLACE.

CHAIN ADJUSTMENT FOR VELOCIPEDES.

SPECIFICATION forming part of Letters Patent No. 614,568, dated November 22, 1898.

Application filed April 2, 1898. Serial No. 676,172. (No model.)

*To all whom it may concern:*

Be it known that I, LEO MELANOWSKI, a citizen of the Republic of France, residing at Buffalo, in the county of Erie and State of New York, have invented a new and useful Improvement in Chain Adjustments for Velocipedes, of which the following is a specification.

This invention relates to the adjusting devices employed on the rear-fork ends of bicycles for adjusting the tension of the driving-chain, and more especially to adjusting devices of this kind comprising a shifting plate or washer connected with the movable rear axle and an adjusting-screw engaging with said plate.

The object of my invention is the provision of a simple and inexpensive chain adjustment which is neat in appearance and which shifts the rear axle positively in both directions.

In the accompanying drawings, Figure 1 is a side elevation of the rear-fork end of a bicycle provided with my improved adjusting device. Fig. 2 is a longitudinal section in line 2 2, Fig. 1. Fig. 3 is a transverse section in line 3 3, Fig. 1, looking forwardly. Fig. 4 is a plan view of the blank from which the shifting plate is formed. Fig. 5 is a detached perspective view of the shifting plate and a portion of the adjusting-screw.

Like letters of reference refer to like parts in the several figures.

A represents the members of the upper and lower rear forks of a bicycle, and B one of the usual flat-sided fork ends connecting the fork members on one side of the rear wheel. Each fork end is provided with the usual longitudinal slot $b$ for the passage of the adjustable rear axle C. D is the hub of the rear wheel mounted on said axle, E the usual small sprocket-wheel secured to the hub, and F the driving-chain. All of these parts are of ordinary and well-known construction.

The rear axle is provided at each end, on the outer side of the fork end, with a shifting plate or washer G, having at its rear end an eye $g$, which encircles the axle.

H is an adjusting-screw whereby the shifting plate G is moved on the fork end for properly tensioning the chain. The screw engages in a screw-threaded opening formed in a lug or bearing $i$, which projects from the outer side of the fork end and is arranged on the front side of the shifting plate. The rear end of the screw is connected with the shifting plate in such manner that the screw, while capable of turning in the lug $i$ and the plate, is held against endwise movement on the plate, thus compelling the plate to move toward or from the lug upon turning the adjusting-screw in one or the other direction. For this purpose the shifting plate is provided at its front end with a lip or ear $g'$, projecting outwardly at right angles thereto and having a slot $g^2$, which receives a cylindrical neck or reduced portion $h$, formed near the rear end on the adjusting-screw. This neck, while free to turn in the slot of the ear $g'$, is confined against endwise movement therein by the shoulder of the screw at the front end of the neck and the head or shoulder $h'$ at the rear end thereof, as shown in Fig. 2, the slot of the ear being narrower than the diameter of the screw. This slot is preferably closed at its outer end and extends inwardly through the body or main portion of the shifting plate, as shown in Figs. 2 and 5. The shifting plate is provided with a slot or opening $g^3$, which communicates with the inner end of the slot of the ear $g'$ and which is of sufficient width to admit the head $h'$ of the adjusting-screw, so as to permit the neck of the screw to enter the narrow slot of said ear. The shifting plate is preferably stamped from a flat blank of sheet metal of the form shown in Fig. 4. After punching the wide and narrow slots in the blank its front portion is bent at right angles to the body thereof to form the ear $g'$.

By this construction the eye of the shifting plate can be readily passed over the rear axle and the slotted ear of the plate can be conveniently passed over the head and neck of the adjusting-screw. As the eyes of the shifting plates or washers embrace the axle on its front and rear sides and the plates are held against endwise movement on the adjusting-screws the axle is shifted positively in both directions by the screws. After effecting the adjustment the axle is clamped by the usual end nuts $j$, which bear against the outer side of the washers or shifting plates. Upon loosening these end nuts sufficiently to permit the slotted ears of the shifting plates to be disconnected from the adjusting-screws the axle can be withdrawn rearwardly from the slotted fork ends, the adjusting-screws remaining attached to the fork ends and the shifting plates being retained upon the axle by the end nuts, thus preventing the parts of the adjustment from becoming lost or mislaid.

This adjusting device is neat and sightly, it affords an ample range of adjustment, and as it is arranged wholly on the outer side of the fork end it does not interfere with the wheel-hub or its bearing-cones.

I claim as my invention—

1. The combination with the fork end having a slot and a lug provided with a screw-threaded opening, of the adjustable axle arranged in said slot, a washer or shifting plate engaging with the axle and provided with a lip or ear having an open slot, and an adjusting-screw arranged in the screw-threaded lug of the fork end and having a neck or contracted portion arranged in the slot of said ear, substantially as set forth.

2. The combination with the fork end and the adjustable axle guided therein, of a washer or shifting plate engaging with the axle and provided at its front end with a lip or ear having a slot which extends inwardly through the body of the plate, said plate being provided with a slot or opening which is wider than the slot of said ear and which communicates therewith, and an adjusting-screw arranged in a screw-threaded lug on said fork end and having a neck or contracted portion arranged in the slot of said ear, substantially as set forth.

3. The combination with the fork end and the adjustable axle guided therein, of a washer or shifting plate provided at its rear end with an eye which encircles the axle and at its front end with an ear having a slot which extends inwardly through the body of the plate, said plate having a slot or opening which is wider than the slot of said ear and which communicates therewith, and an adjusting-screw arranged in a screw-threaded lug on the fork end and provided near its rear end with a reduced portion forming a cylindrical neck which is arranged in the slot of said ear and a head which is adapted to pass through the enlarged slot or opening in the body of the plate, substantially as set forth.

Witness my hand this 26th day of March, 1898.

LEO MELANOWSKI.

Witnesses:
WILLIAM H. CROSBY,
CARL F. GEYER.